United States Patent
Gruber et al.

(10) Patent No.: US 7,057,161 B2
(45) Date of Patent: Jun. 6, 2006

(54) POSITION MEASURING DEVICE

(75) Inventors: Alexander Gruber, St. Georgen (DE); Michael Hermann, Tacherting (DE); Wolfgang Holzapfel, Obing (DE); Markus Kühler, Nussdorf (DE); Herbert Pronold, Traunreut (DE); Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 53 days.

(21) Appl. No.: 10/483,971

(22) PCT Filed: Jul. 5, 2002

(86) PCT No.: PCT/EP02/07453

§ 371 (c)(1), (2), (4) Date: Jul. 23, 2004

(87) PCT Pub. No.: WO03/006926

PCT Pub. Date: Feb. 13, 2003

(65) Prior Publication Data

US 2004/0245442 A1    Dec. 9, 2004

(30) Foreign Application Priority Data

Jul. 9, 2001   (DE)   ................ 101 32 521

(51) Int. Cl.
*G01D 5/34* (2006.01)

(52) U.S. Cl. ............. 250/231.14; 250/231.13; 250/237 G; 356/617; 356/620

(58) Field of Classification Search ........ 250/231.13, 250/231.14, 231.15, 231.16, 231.18, 237 G; 356/614, 616, 617, 620; 341/13, 14
See application file for complete search history.

(56) References Cited

U.S. PATENT DOCUMENTS

| 4,593,472 | A |   | 6/1986 | Berner | 33/706 |
| 4,654,527 | A | * | 3/1987 | Schmitt | 250/237 G |
| 4,677,293 | A |   | 6/1987 | Michel | 250/237 G |
| 5,648,658 | A |   | 7/1997 | Holzapfel et al. | 250/237 G |
| 6,031,224 | A |   | 2/2000 | Peterlechner | 250/231.13 |
| 6,229,140 | B1 | * | 5/2001 | Ishizuka | 250/237 G |

FOREIGN PATENT DOCUMENTS

DE          92 09 801 U1    10/1992

(Continued)

*Primary Examiner*—Thanh X. Luu
*Assistant Examiner*—Stephen Yam
(74) *Attorney, Agent, or Firm*—Brinks Hofer Gilson & Lione

(57) ABSTRACT

A position measuring device having a scanning device and a scale, wherein the scanning device is movable in relation to the scale in a measuring direction. The scale including a measuring graduation, wherein periodic measuring signals are generated when the scanning device scans the measuring graduation and a reference marking, wherein a reference marking signal is generated when the scanning device scans the reference marking with a scanning beam bundle. The scale further includes a first optically scannable area marking next to the reference marking and a second optically scannable area marking next to the reference marking and which has a different optical deflection property than the first optically scannable area marking, wherein photoelectric scanning of the first and second optically scannable area markings with the scanning beam bundle from the scanning device generates an area signal that differentiates characteristics of the first and second optically scannable area markings. A first photo-receiver receives light from the first optically scannable area marking and a second photo-receiver receives light from the second optically scannable area marking.

21 Claims, 7 Drawing Sheets

FOREIGN PATENT DOCUMENTS

| | | |
|---|---|---|
| DE | 41 11 873 C2 | 5/1995 |
| EP | 0 145 844 B1 | 6/1985 |
| EP | 0 160 811 A1 | 11/1985 |
| EP | 0 498 904 A1 | 8/1992 |
| EP | 0 895 063 A1 | 2/1999 |
| EP | 0 669 518 B1 | 1/2000 |

* cited by examiner

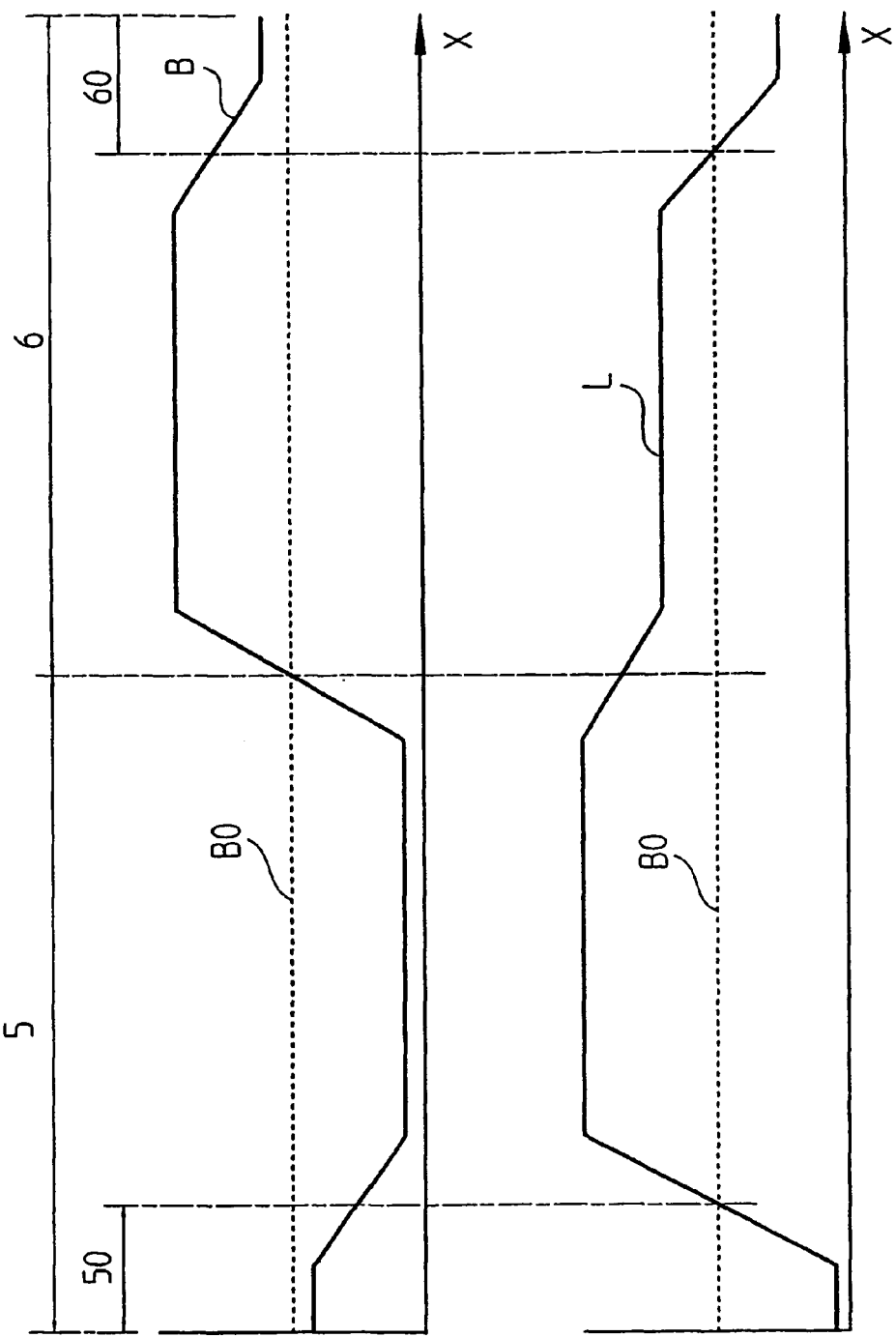

POSITION MEASURING DEVICE

Applicants claim, under 35 U.S.C. §§ 120 and 365, the benefit of priority of the filing date of Jul. 5, 2002 of a Patent Cooperation Treaty patent application, copy attached, Serial Number PCT/EP02/07453, filed on the aforementioned date, the entire contents of which are incorporated herein by reference, wherein Patent Cooperation Treaty patent application Serial Number PCT/EP02/07453 was not published under PCT Article 21(2) in English.

Applicants claim, under 35 U.S.C. § 119, the benefit of priority of the filing date of Jul. 9, 2001 of a German patent application, copy attached, Serial Number 101 32 521.5, filed on the aforementioned date, the entire contents of each of which are incorporated herein by reference.

BACKGROUND OF THE INVENTION

1. Field of the Invention

The present invention relates to a position measuring device.

2. Description of the Related Art

Such position measuring devices are employed in particular in connection with processing machinery for measuring the relative position of a tool in relation to a workpiece to be processed, with coordinate-measuring machinery for determining the position and dimensions of test objects, and lately increasingly in the semiconductor industry as well, for example in connection with wafer steppers. In this case the position measuring device is an angle or linear measuring device, wherein the scale is directly installed on the drive unit (rotatory motor or linear motor), or the scale is installed on a component driven by the drive unit.

The scale of such a position measuring device known, for example, from DE 92 09 801 U1, has a periodic scale graduation for generating counting signals, as well as reference markings for generating reference marking signals. An absolute relation of the position measurement will be produced for the position of the reference marking via this reference marking signal in that a counter is placed at a predetermined counter setting.

It is often necessary at the start of a position measurement following a break in the operation because of loss of energy supply, as well as for correcting and checking the counter setting, to approach the reference marking starting from an arbitrary position. To this end, area markings have been applied to the scale, by which it is possible to differentiate whether the scanning device is located on one or the other side of the reference markings. This area marking is embodied on one side of the reference markings in the form of a continuous opaque strip. On the other side of the reference markings the area marking is embodied as a transparent area. A common photo receiver is arranged in the scanning device for scanning both area markings. The decision as to whether the scanning device is located on one or the other side of the reference markings is made on the basis of a measuring signal from this photo receiver.

It has been shown that because of the signal levels of this measuring signal this differentiation is problematic, since the mutual distance between the levels is very short. This measuring signal can also easily be affected by partial soiling or contamination of the scale, so that a wrong position of the scanning device is detected.

SUMMARY AND OBJECTS OF THE INVENTION

It is therefore an object of the present invention to disclose a position measuring device by which it is possible to more assuredly differentiate between several measuring areas next to the reference markings.

This object is attained by a position measuring device having a scanning device and a scale, wherein the scanning device is movable in relation to the scale in a measuring direction. The scale including a measuring graduation, wherein periodic measuring signals are generated when the scanning device scans the measuring graduation and a reference marking, wherein a reference marking signal is generated when the scanning device scans the reference marking with a scanning beam bundle. The scale further includes a first optically scannable area marking next to the reference marking and a second optically scannable area marking next to the reference marking and which has a different optical deflection property than the first optically scannable area marking, wherein photoelectric scanning of the first and second optically scannable area markings with the scanning beam bundle from the scanning device generates an area signal that differentiates characteristics of the first and second optically scannable area markings. A first photo-receiver receives light from the first optically scannable area marking and a second photo-receiver receives light from the second optically scannable area marking.

The position measuring device designed in accordance with the present invention has the particular advantage that the assurance of an unequivocal differentiation as to whether the scanning device is located on one or the other side of the reference markings is relatively great. The safeguard against interference is increased.

The present invention will be explained in greater detail in what follows by an exemplary embodiment, making reference to the drawings.

Shown are in:

BRIEF DESCRIPTION OF THE DRAWINGS

FIG. 10 shows a possible area signal generated in the circuit arrangement of FIG. 9; and FIG. 11 shows a possible limit signal generated in the circuit arrangement of FIG. 9.

DESCRIPTION OF THE PREFERRED
EMBODIMENT(S) OF THE INVENTION

Figure 1:
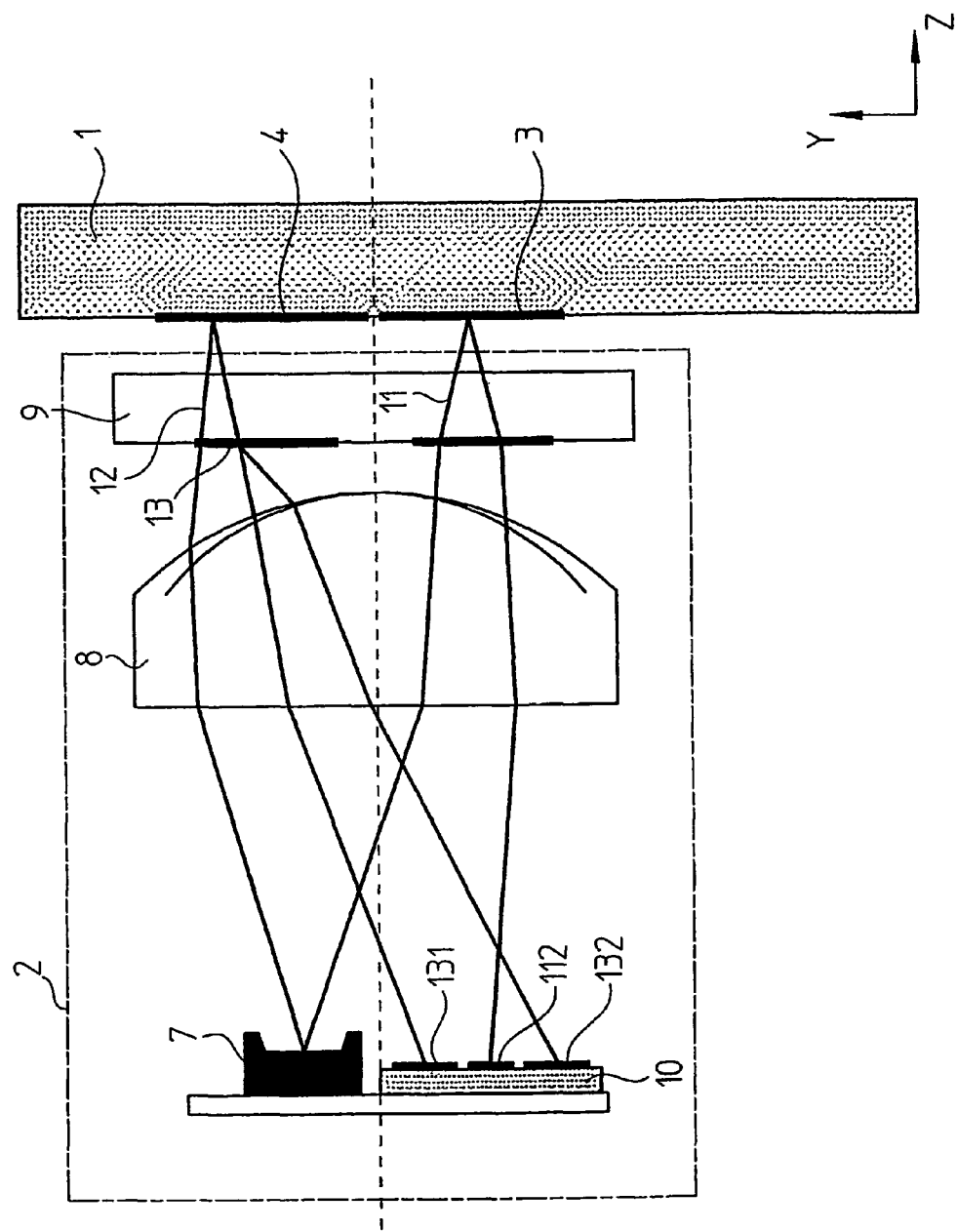
FIG. 1 shows a schematic sectional representation of an embodiment of a position measuring device in accordance with the present invention.
Figure 5:
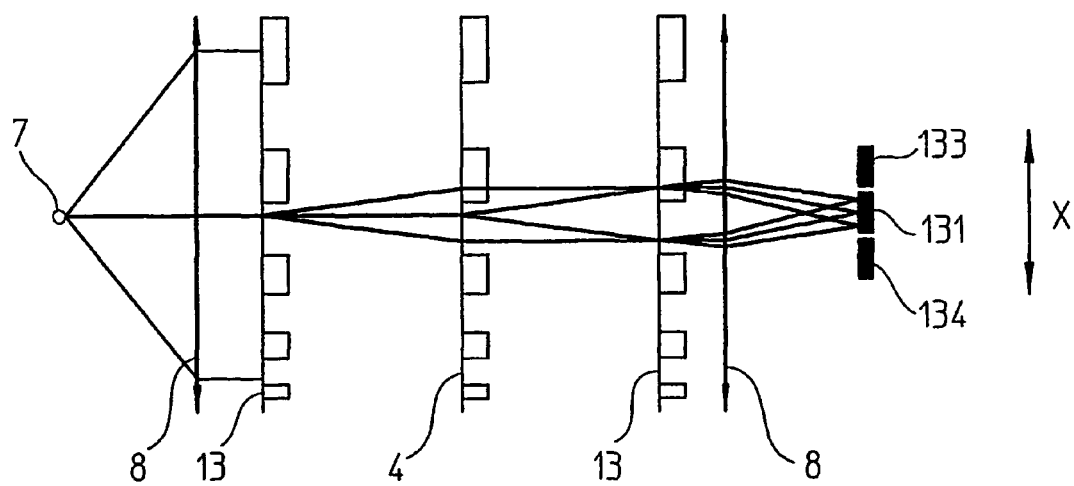
FIG. 5 shows a possible path course of the scanning beams used in the position measuring device of FIG. 1 in the area of the reference markings.
Figure 7:
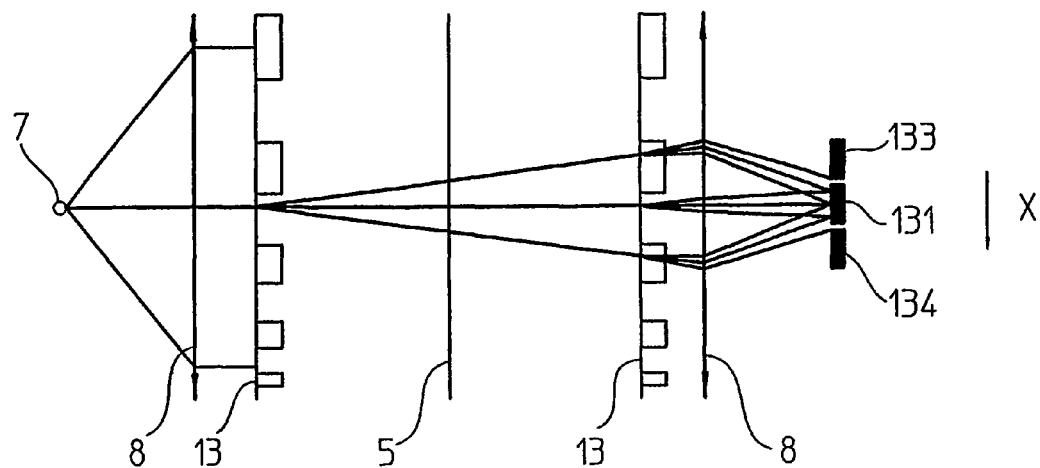
FIG. 7 shows a possible path of the scanning beams of the position measuring device of FIG. 1 on one side of the reference markings.
Figure 8:
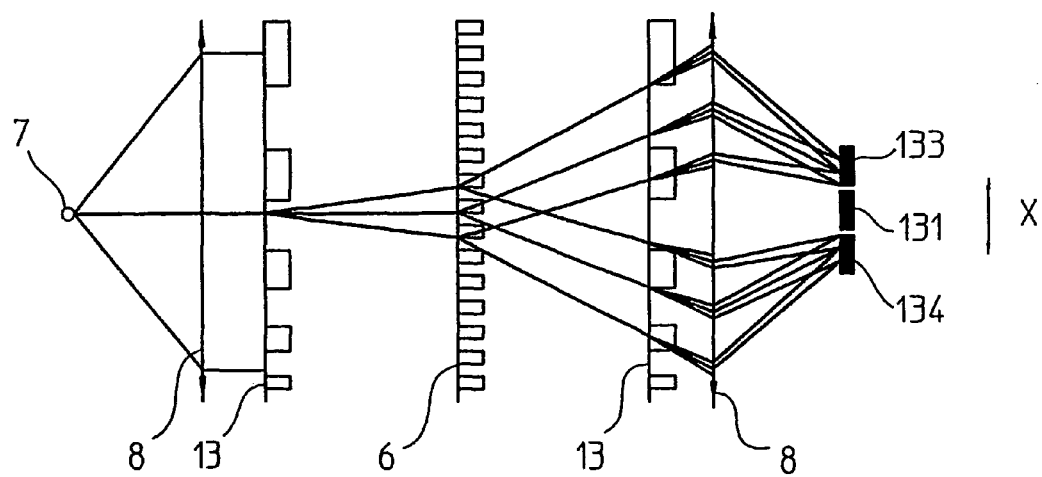
FIG. 8 shows the path of the scanning beams of FIG. 7 on the other side of the reference markings.

A photoelectric incremental position measuring device in the form of a linear measuring device, having a scale 1, which can be displaced in the measuring direction X in relation to a scanning device 2, is shown in FIG. 1. A periodic incremental measuring graduation 3 has been applied to the scale 1 in a first track, and in a second track a reference marking 4, as well as area markings 5 and 6. For photoelectric scanning of the scale 1, the scanning device 2 includes a light source 7, whose light is bundled in a collimator 8 and is directed through a scanning plate 9 onto the scale 1. The light impinging on the scale 1 is reflected in a position-dependent manner at the measuring graduation 3, the reference marking 4, as well as the area markings 5 and 6 and impinges on the photo receiver arrangement 10. The scale 1 is represented in a view from above in FIG. 2, and the photo receiver arrangement 10 in FIG. 3. How the light is affected as a function of position is represented in FIGS. 5, 7 and 8.

A scanning beam bundle 11, which impinges on the reflecting phase grating 3, is modulated as a function of the position by being diffracted into different partial beam bundles, which are subsequently brought into interference with each other and impinge on the three photo receivers 111, 112, 113 which, by an interferential scanning principle, generate in a known manner analog periodic measuring signals M1, M2, M3 which are phase-shifted in respect to each other, from which high-resolution counting signals are generated in a known manner by interpolation.

Figure 4:
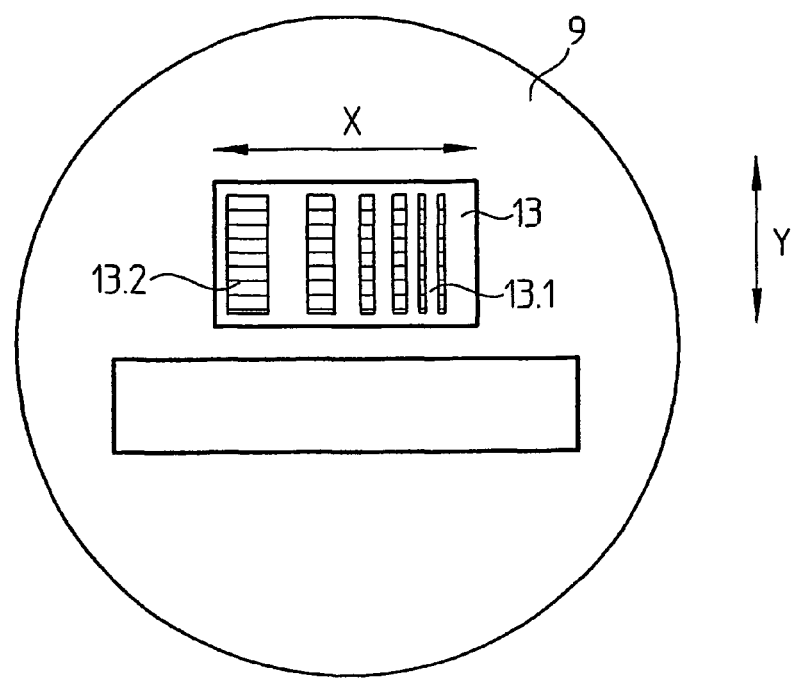
FIG. 4 shows a view from above on an embodiment of a scanning plate to be used with the position measuring device of FIG. 1 in accordance with the present invention.
Figure 6:
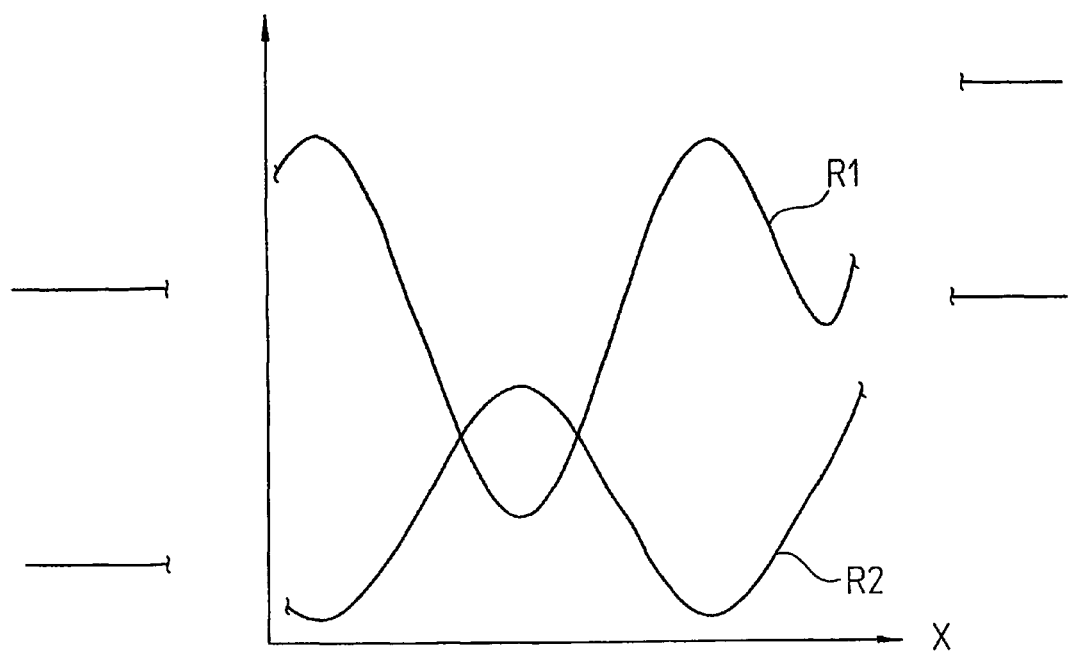
FIG. 6 shows possible reference marking signals generated by the position measuring device of FIG. 1.

A scanning beam bundle 12 is guided in the area of the reference marking 4 to the scanning plate 9 by the reflecting fields of the reference marking 4. In the area in which this reflected light impinges, the scanning plate 9 has a scanning field 13, which includes an aperiodic grating with transparent fields 13.1 and transversely deflecting fields 13.2 (FIG. 4). A transverse split occurs, since the light passes through this field 13 on the way to, as well as back from the scale 1. By a suitable selection of the grating parameters it is possible to generate a counter-clock reference marking signal R1 from the light which reaches the receiver 131 (FIG. 6). Another part is deflected into transverse first orders, of these, one is detected by the photo receiver 132 and a clock reference marking signal is generated by the latter (FIG. 6). A resulting reference marking signal R is generated by superimposition (R=R2−R1) of the counter-clock reference marking signal R1 on the clock reference marking signal R2. The design of the scanning plate 9 for scanning the reference marking 4 is represented in FIG. 4, and the path of the scanning beams in FIG. 5. This scanning principle is extensively explained in EP 0 669 518 B1, which corresponds to U.S. Pat. No. 5,648,658 the entire contents of which is incorporated herein by reference.

A first segment of the collimator 8 is used for collimating the scanning beam bundle 12 of the upper track to the photo receivers 131, 132, 133, 134, and a second segment of the collimator 8 is used for collimating the scanning beam bundle 11 of the lower track to the photo receivers 111, 112, 113. The segments are only represented schematically in FIG. 1.

The reference marking 4 in the form of an aperiodic phase grating extends over several graduation periods of the measuring graduation 3. When the scanning field 13 is located exactly opposite the reference marking 4, the photo receivers 131, 132 generate a reference marking signal which is unequivocally assigned to an incremental timing impulse. This timing impulse unequivocally defines a portion of the track which, because of the interpolation, is smaller than a graduation period of the measuring graduation.

The scale 1 is evenly reflective on the left side of the reference marking 4. If the scanning device 2 is located opposite this reflecting area marking 5, the impinging scanning beam bundle 12 is directed in accordance with the path of the scanning beams in FIG. 7 onto the photo receiver 131.

A diffraction grating 6 as an area marking is arranged at the right side of the reference marking 4 on the scale 1. This diffraction grating 6 is a phase grating which suppresses the 0th order of diffraction to a large degree and deflects the impinging scanning beam bundle 12 into the ±1st order of diffraction. These diffraction orders, which were reflected at the diffraction grating 6 and deflected in the measuring direction X, are concentrated on the photo receivers 133, 134 by the collimator 8. This path of scanning beams is represented in FIG. 8.

Thus, the direction of light is deflected at the area markings 5, 6 as a function of the position of the scale. Gratings with their properties of grating constant and/or grating orientation are particularly suited for the direction deflection. The information regarding the direction deflection is coded out in the focal plane of the lens 8, since a point in the focal plane of the lens 8, where suitable photo elements 131, 133, 134 can be placed, is assigned to each grating constant and each grating direction.

Advantageously the measuring graduation 3, the reference marking 4 and the area marking 6 are phase gratings, which entails the advantage that these gratings 3, 4, 6 can be produced in mutual method steps and that therefore the correct assignment of the gratings 3, 4, 6 in relation to each other is assured. In the example, the phase grating 6 has the same parameters as the measuring grating 3.

Because of the optically different design of the right and left side of the reference marking 4, the scanning beam bundle 12 is either reflected into one direction and directed onto the photo receiver 131 or, reflected into a direction different therefrom, is directed onto the photo receivers 133, 134. Thus, an unequivocal area signal B (FIG. 10) is available in both positions. In contrast to the prior art, an area signal greater than zero is available on both sides of the reference marking 4, so that a disruption of the scanning beam path, for example because of soiling or contamination, can also be detected.

Because of the step in accordance with the present invention it is possible to arrange the reference marking 4 and the area markings 5, 6 on a common track, i.e. one behind the other in the measuring direction X, so that the areas 4, 5, 6 are scanned by a common light beam bundle 12. The deflection onto the photo receiver 131 or the photo receivers 133, 134 is accomplished by the directionally selective reflection function of the areas 5 and 6 on the scale 1. This directionally selective reflection of the areas 5 and 6 can also take place in other ways, for example by differently inclined reflecting faces or conical glass faces in case of the transmitted light principle, or by differently deflecting grating areas in the form of longitudinally (in the X direction) or transversely (in the Y direction) deflecting amplitude or phase gratings.

For generating the area signal B represented in FIG. 10, the output signal R1 from the photo receiver 131 and the output signal B1 from the photo receivers 133, 134 are conducted to a differential circuit 20. An unequivocal differentiation whether the scanning device 2 is located on the right or the left side of the reference marking 4 can be made from the amplitude of the area signal B. It can be seen that the mutual distance between the levels is relatively large. Because of forming the difference, the area signal B becomes independent to a large extent of the illumination strength.

Figure 9:
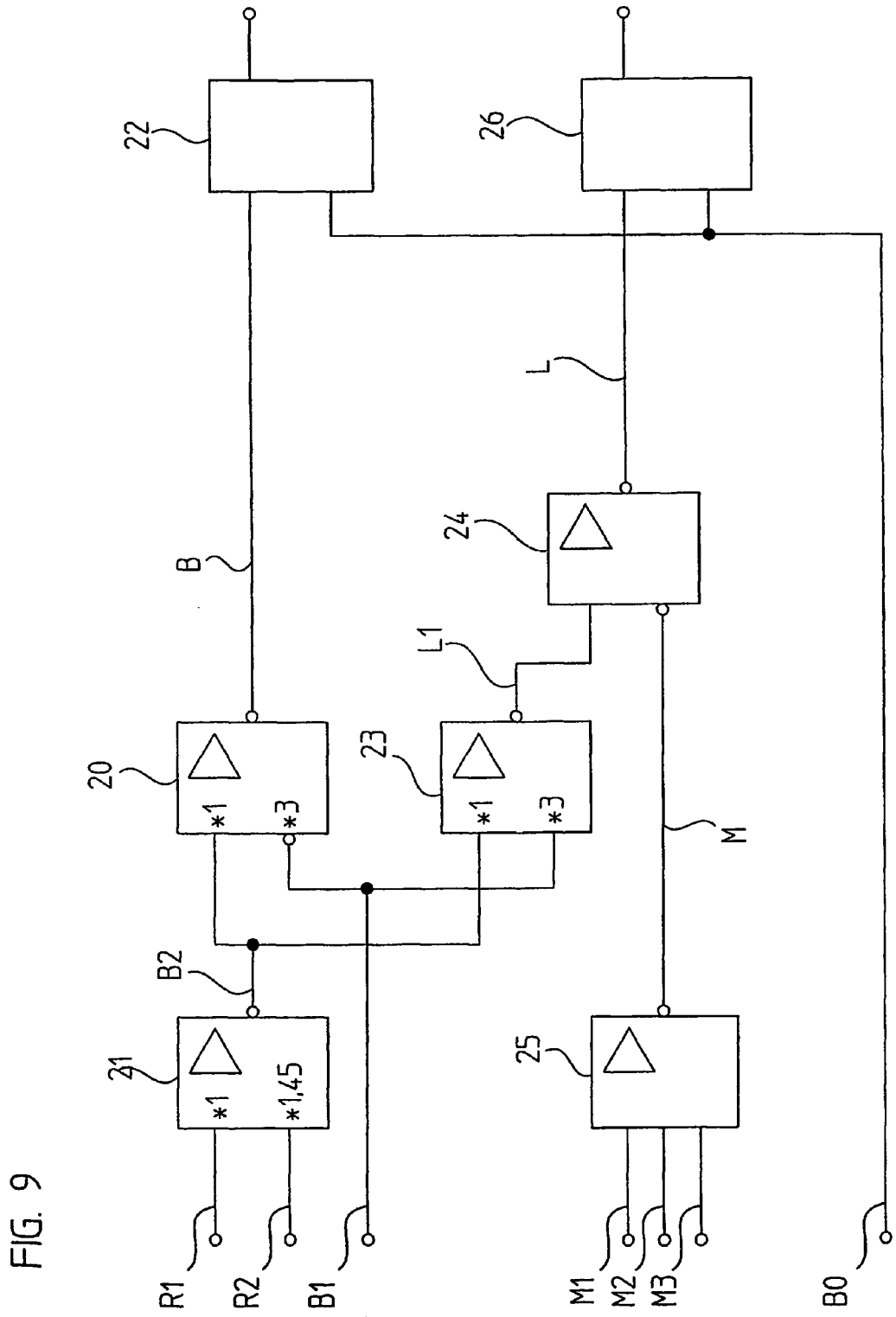
FIG. 9 shows an embodiment of a circuit arrangement used with the position measuring device of FIG. 1 in accordance with the present invention.

A particularly advantageous evaluation unit for forming the area signal B is represented in detail in FIG. 9. The counter-clock reference marking signal R1 and the clock reference marking signal R2 are added together, weighted differently, in an adder 21 to form the signal B2=R1+ 1.45·R2. By this a smoothing of the otherwise relatively strongly oscillating area signal B is achieved in the area of the reference marking 4. The output signal B2 from the adder 21, as well as the signal B1, are supplied to the differential circuit 20 for forming the area signal B=B2− 3·B1. The area signal B is fed to a comparator 22, in which the area signal B is compared with a reference value B0. If the reference signal B is greater than the reference value B0, this means that the scanning device 2 is located on the right side of the reference marking 4. If the reference signal B is less than the reference value B0, this means that the scanning device 2 is located on the left side of the reference marking 4.

In the prior art (DE 92 09 801 U1) mentioned in the introduction, so-called control markings are attached to the left and right of the reference marking to the ends of the scale in addition to the area markings. These control markings define the extreme positions of the scanning device and are also called end position switches or limit markers. Position measuring devices with such end position switches, or limit markers, are also described in DE 41 11 873 C2 and EP 0 145 844 B1, which corresponds to U.S. Pat. No. 4,593,472 the entire contents of which is incorporated herein by reference.

Figure 2:
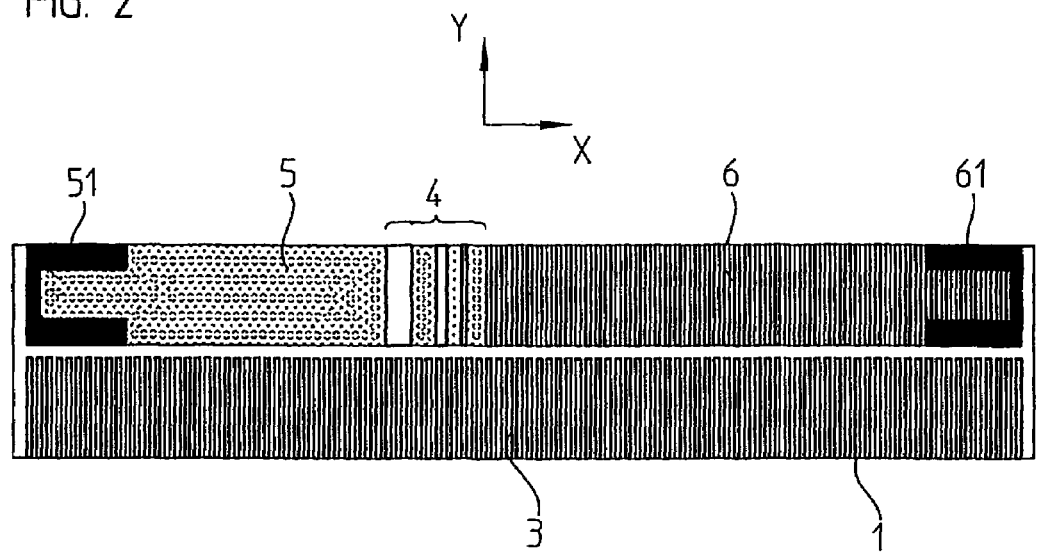
FIG. 2 shows a view from above on an embodiment of a scale to be used with the position measuring device of FIG. 1 in accordance with the present invention.
Figure 3:
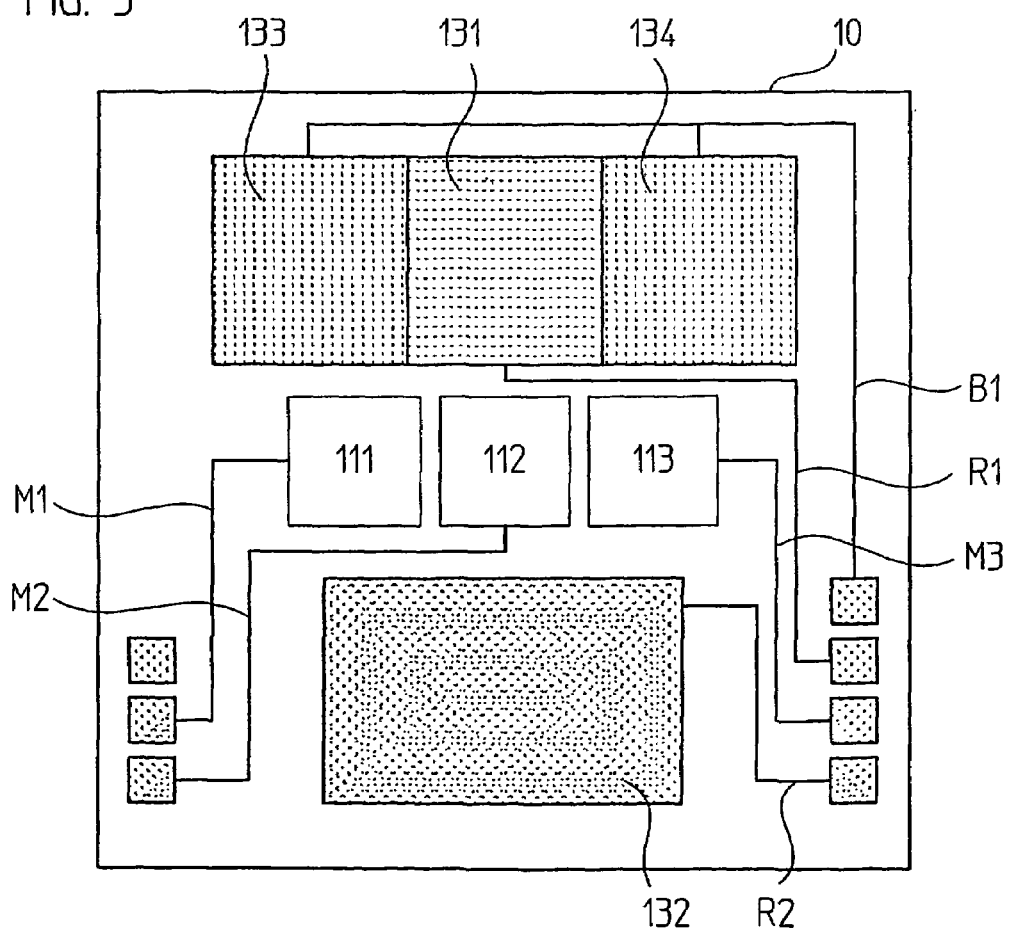
FIG. 3 shows a view from above on an embodiment of a photo receiver arrangement to be used with the position measuring device of FIG. 1 in accordance with the present invention.

In connection with a position measuring device with area markings designed in accordance with the present invention, the function of end position switches can be realized in a particularly advantageous manner in that the area markings 5, 6 are partially covered in the limit areas 50, 60. As represented in FIG. 2, screens 51, 61 have been applied to the scale 1 to this end. These screens 51, 61 can be realized in the form of displaceable clips extending around the scale 1 and made of spring sheet metal, or they can also be sputtered on or glued to the surface of the scale 1, or embodied in the form of filter glass. The screens 51, 61 particularly affect the output signals B1, R1 of the photo receivers 133, 134, 131, and therefore also the level of the area signal B in the limit areas 50, 60. Four different areas of the scale 1 can be distinguished by the path of the area signal B, namely the left limit area 50, the left area 5 of the reference marking 4, the right area 6 of the reference marking 4, as well as the right limit area 60. Since the different deflection of the scanning beam bundle 12 is maintained in the limit areas 50, 60, the directional information—right side, or left side of the reference marking 4—is also contained in the limit areas 50, 60.

A particularly advantageous circuit arrangement is represented in FIG. 9, by which a limit signal L can be generated, as represented in FIG. 11. The limit signal 11 generated by this has a relatively high level difference between the limit areas 50, 60 and the remaining area. Therefore the interference distance is relatively large.

For generating the limit signal L, the circuit arrangement has an adder 21, which adds together the counter-clock reference marking signal R1 and the clock reference marking signal R2, weighted differently, to form the signal B2=R1+1.45·R2. The output signal B2 from the adder 21, as well as the signal B1, are fed to a further adder 23 for forming the signal L1=B2+3·B1. The signal L1 is supplied to a differential circuit 24 for forming the limit signal L=L1−M, wherein M is the sum of the measuring signals M1, M2, M3 from the measuring graduation 3, which have been added together in an adder 25. The limit signal L is conducted to a comparator 26, in which the limit signal L is compared with a reference value B0. If the limit signal L is greater than the reference value B0, this means that the scanning unit 2 is located in the permissible area. If the limit signal L is less than the reference value B0, this means that the scanning unit 2 is located in one of the limit areas 50 or 60. Whether the scanning unit 2 is located in the right or in the left limit area is determined by the area signal B.

The directionally selective deflection onto the photo receivers 131, or 133, 134, is maintained because of the optical influence on the area markings 5, 6 in the limit areas 50, 60, so that no additional photo receivers are required for scanning the limit areas 50, 60. Furthermore, a space-saving arrangement of the area markings 5, 6, and of the limit areas is assured. It is advantageous if for forming the area signal B, the scanning signals R1, B1 are combined in a circuit arrangement in accordance with a first linkage rule, and for forming the limit signal L in a second linkage rule differing from the first, wherein the first linkage rule contains the formation of the difference between the scanning signals (R1−B1), and the second linkage rule an addition (R1+B1). In case of soiling or contamination of the scale 1, or an interruption in the scanning beam path, the limit signal L falls below the reference value B0. In this example the same information is generated in case of an error than if a limit area had been reached.

Alternatively the limit markings can also be established in that the intensity of the orders of diffraction is varied, used for this are the grating parameter dash-gap conditions and, with phase gratings, the phase depth. With this alternative the direction of the deflected light, and therefore the area information, is also maintained.

The limit markings can also be constituted by further deflecting areas which differ from the area markings 5, 6 in such a way that they direct the impinging light in an other direction onto further photo receivers. In this case, the limit markings are then gratings with other grating parameters (graduation period and/or grating direction) than the gratings of the area markings 5, 6. If the first orders of diffraction are detected, different locations in the focal plane, and therefore different photo elements, are available to the limit areas.

In accordance with the represented example, the scale 2 is embodied to be reflecting. In a manner not represented, the scale can also be embodied to be transparent, so that the gratings 3 and 6 are designed as transparent diffraction gratings. Thus, the present invention can be realized for incident, as well a transmitted light scanning.

The different photo receivers 131, 133, 134 are discrete individual receivers, or elements of an array.

In the above represented advantageous example, the area markings for differentiating between various measuring areas along the scale are gratings with different grating parameters, wherein the grating parameters change suddenly from one measuring area to another measuring area. In an alternative way, the grating parameters can also change continuously in order to design a greater number of measuring areas differently from each other.

A further application of area markings is the marking of the surrounding area on both sides of the reference marking. It is therefore possible to generate an area signal in areas on both sides of the reference marking which points out the next reference marking, so that as a result of this it is possible to reduce the displacement speed, if required.

In conclusion, the invention therefore consists in disclosing a position measuring device having a scale and a scanning device, which is movable in relation to the latter in the measuring direction, wherein the scale has a measuring graduation, and periodic measuring signals can be generated by scanning the measuring graduation, the scale has at least one reference marking, and a reference marking signal can be generated by scanning the reference marking signal, the scale has optically scannable area markings, and by the photoelectric scanning of the area markings with a scanning beam bundle an area signal can be generated, by whose characteristics several measuring areas next to the reference marking can be differentiated, and the area markings are optically differently deflecting elements, which deflect the impinging scanning beam bundle in the various measuring areas onto different photo receivers.

Further embodiment variations of the method in accordance with the present invention of course exist besides the explained example.

The invention claimed is:

1. A position measuring device comprising:
a scanning device; and
a scale, wherein said scanning device is movable in relation to said scale in a measuring direction, said scale comprising:
a measuring graduation, wherein periodic measuring signals are generated when said scanning device scans said measuring graduation;
a reference marking, wherein a reference marking signal is generated when said scanning device scans said reference marking with a scanning beam bundle;
a first optically scannable area marking next to said reference marking and a second optically scannable area marking next to said reference marking and which has a different optical deflection property than said first optically scannable area marking, wherein photoelectric scanning of said first and second optically scannable area markings with said scanning beam bundle from said scanning device generates an area signal that differentiates characteristics of said first and second optically scannable area markings;
a first photo-receiver receives light from said first optically scannable area marking; and
a second photo-receiver receives light from said second optically scannable area marking.

2. The position measuring device in accordance with claim 1, wherein said first and second optically scannable area markings are each a grating with different grating parameters.

3. The position measuring device in accordance with claim 2, wherein said measuring graduation, said reference marking and said first and second optically scannable area markings are each phase gratings.

4. The position measuring device in accordance with claim 1, wherein said first and second area markings and said reference marking are arranged on a common track.

5. The position measuring device in accordance with claim 1, wherein said first and second photo-receivers are arranged in such a way that said scanning beam bundle that scans said reference marking is also directed onto at least one of said first and second photo-receivers.

6. The position measuring device in accordance with claim 1, wherein said area signal differentiates whether said scanning device is located on a first or a second side of said reference marking, in that said first optically scannable area marking is on said first side of said reference marking and is embodied in such a way that said scanning beam bundle impinges on said first photo-receiver, and said second optically scannable area marking is on said second side of said reference marking and is embodied in such a way that said scanning beam bundle impinges on said second photo-receiver.

7. The position measuring device in accordance with claim 6, wherein said first optically scannable area marking on said first side of said reference marking is reflecting or transparent, and said second optically scannable area marking on said second side of said reference marking are each embodied as a diffraction grating.

8. The position measuring device in accordance with claim 6, wherein said scale comprises a limit area that is formed by a partial change in an optical effect of said first optically scannable area marking.

9. The position measuring device in accordance with claim 7, wherein said scale comprises a limit area that is formed by a partial change in an optical effect of said first optically scannable area marking.

10. The position measuring device in accordance with claim 8, wherein said limit area is formed by a partial covering of said first optically scannable area marking.

11. The position measuring device in accordance with claim 9, wherein said limit area is formed by a partial covering of said first optically scannable area marking.

12. The position measuring device in accordance with claim 10, wherein a screen is applied to said first optically scannable area marking.

13. The position measuring device in accordance with claim 11, wherein a screen is applied to said first optically scannable area marking.

14. The position measuring device in accordance with claim 6, wherein a scanning signal is generated by said first and second photo-receivers by photoelectric scanning of said first and second optically scannable area markings, wherein said area signal is formed by combining said reference marking signal and said scanning signal in an evaluation unit in accordance with a first linkage rule, and a limit signal is formed by combining said reference marking signal and said scanning signal in said evaluation unit in accordance with a second linkage rule.

15. A position measuring device comprising:
a scanning device; and
a scale, wherein said scanning device is movable in relation to said scale in a measuring direction, said scale comprising:
a measuring graduation, wherein periodic measuring signals are generated when said scanning device scans said measuring graduation;
a first optically scannable area marking and a second optically scannable area marking which has a different optical deflection property than said first scannable area marking, wherein photoelectric scanning of said first and second optically scannable area markings with said scanning beam bundle from said scanning device generates an area signal that differentiates characteristics of said first and second optically scannable area markings;
a first photo-receiver receives light from said first optically scannable area marking;
a second photo-receiver receives light from said second optically scannable area marking; and
wherein said scale comprises a limit area that is formed by a partial change in an optical effect of said first optically scannable marking, wherein said partial change alters an intensity of said light that is received by said first photo-receiver.

16. The position measuring device in accordance with claim 15, wherein said first and second optically scannable area markings are each a diffraction grating with different grating parameters.

17. The position measuring device in accordance with claim 16, wherein said measuring graduation and said first and second optically scannable area markings are each phase gratings.

18. The position measuring device in accordance with claim 15, wherein said limit area is formed by a partial covering of said first optically scannable area marking.

19. The position measuring device in accordance with claim 18, wherein a screen is applied to said first optically scannable area marking.

20. The position measuring device in accordance with claim 16, wherein a diffraction grating in said limit area is established in that an intensity of light of one order of diffraction is varied.

21. The position measuring device in accordance with claim 15, wherein a scanning signal is generated by said first and second photo-receivers by photoelectric scanning of said first and second optically scannable area markings, wherein said area signal is formed by combining said reference marking signal and said scanning signal in an evaluation unit in accordance with a first linkage rule, and a limit signal is formed by combining said reference marking signal and said scanning signal in said evaluation unit in accordance with a second linkage rule.

* * * * *